(12) United States Patent
Bacchus

(10) Patent No.: US 11,875,578 B2
(45) Date of Patent: Jan. 16, 2024

(54) DETERMINATION OF TRAFFIC LIGHT ORIENTATION

(71) Applicant: GM Global Technology Operations LLC, Detroit, MI (US)

(72) Inventor: Brent Navin Roger Bacchus, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 289 days.

(21) Appl. No.: 17/400,698

(22) Filed: Aug. 12, 2021

(65) Prior Publication Data

US 2023/0047947 A1    Feb. 16, 2023

(51) Int. Cl.
| | |
|---|---|
| *G06K 9/00* | (2022.01) |
| *G06V 20/58* | (2022.01) |
| *G06N 3/04* | (2023.01) |
| *G06V 10/48* | (2022.01) |
| *G06F 18/213* | (2023.01) |

(52) U.S. Cl.
CPC .......... *G06V 20/584* (2022.01); *G06F 18/213* (2023.01); *G06N 3/04* (2013.01); *G06V 10/48* (2022.01)

(58) Field of Classification Search
CPC ...... G06V 20/584; G06V 10/48; G06V 10/82; G06V 10/44; G06V 20/58; G06F 18/213; G06N 3/04; G06N 3/0464
See application file for complete search history.

(56) References Cited

U.S. PATENT DOCUMENTS

| | | | |
|---|---|---|---|
| 2016/0318490 A1* | 11/2016 | Ben Shalom ... | B60W 30/18154 |
| 2019/0332875 A1* | 10/2019 | Vallespi-Gonzalez ...... G05D 1/0088 | |
| 2022/0343178 A1* | 10/2022 | Hall ...... | G06F 18/214 |

FOREIGN PATENT DOCUMENTS

CN    112101107 A  * 12/2020  ............. G06V 10/50

* cited by examiner

*Primary Examiner* — Dhaval V Patel
(74) *Attorney, Agent, or Firm* — Vivacqua Crane PLLC

(57) ABSTRACT

A system for determining relevance of a light source to an automobile includes at least one camera adapted to capture images of light sources in proximity to the automobile, a controller in communication with the at least one camera and adapted to receive captured images from the at least one camera, the controller further adapted to estimate an orientation of at least one light source relative to the automobile, classify the at least one light source as one of relevant and irrelevant, and, when the at least one light source is classified as relevant, send information about the at least one light source to a planning module for the automobile.

16 Claims, 3 Drawing Sheets

DETERMINATION OF TRAFFIC LIGHT ORIENTATION

INTRODUCTION

The present disclosure relates to a system for detection of light sources and determining an angular orientation of such light sources to an automobile to classify such light sources as relevant or irrelevant.

Many vehicle are equipped with cameras to assist in detecting objects in proximity to a vehicle. Autonomous automobiles use these cameras to aid in determining what actions to take when controlling the vehicle, such as capturing an image of a traffic light, identifying the critical color (red, yellow, green) of the traffic light, and sending information to a planning module to allow the planning module to take appropriate action.

Often, more than one traffic light may be captured by cameras, or a traffic light that is not meant to apply to the automobile that detects it is captured. In such instances the planning module for an autonomous vehicle can become confused preventing the planning module from properly guiding the automobile and potentially causing inappropriate control of the automobile.

Thus, while current systems achieve their intended purpose, there is a need for a new and improved system and method for determining the relevance of a light source to an automobile.

SUMMARY

According to several aspects of the present disclosure, a method of determining relevance of a light source to an automobile includes capturing images, with at least one camera, of light sources in proximity to the automobile and sending captured images to a controller, using a Convolutional Neural Network technique to determine, with the controller, the location of at least one light source within an image by identifying connected pixels corresponding to critical colors and extracting elliptical areas of the critical colors, estimating, with the controller, widths and heights of the extracted elliptical areas using one of an elliptical Hough transform and weighted standard deviation of horizontal and vertical pixel coordinates using pixel luminance as weights, filtering, with the controller, the estimated widths and heights of the extracted elliptical areas using a Hampel filter to remove outliers, filtering, with the controller, the estimated widths and heights of the extracted elliptical areas over time using a Kalman filter to reduce noise, estimating, with the controller, an orientation of the at least one light source relative to the automobile by calculating an angle of orientation of the at least one light source, classifying the at least one light source as relevant when the angle of orientation of the at least one light source is greater than a pre-determined angle, and when the at least one light source is classified as relevant, sending information about the at least one light source to a planning module for the automobile.

According to another aspect, the method further includes identifying corresponding points between known shapes and the at least one light source, computing a homography matrix of the at least one light source, and decomposing the homography matrix to determine an angle of orientation of the at least one light source.

According to several aspects of the present disclosure, a system for determining relevance of a light source to an automobile includes at least one camera adapted to capture images of light sources in proximity to the automobile, a controller in communication with the at least one camera and adapted to receive captured images from the at least one camera, the controller further adapted to estimate an orientation of at least one light source relative to the automobile, classify the at least one light source as one of relevant and irrelevant, and, when the at least one light source is classified as relevant, send information about the at least one light source to a planning module for the automobile.

According to another aspect, the controller is further adapted to use a Convolutional Neural Network technique to determine the location of the at least one light source within an image by identifying connected pixels corresponding to critical colors and extracting elliptical areas of the critical colors when estimating the orientation of the at least one light source relative to the automobile.

According to another aspect, the controller is further adapted to estimate widths and heights of the extracted elliptical areas by one of an elliptical Hough transform and weighted standard deviation of horizontal and vertical pixel coordinates using pixel luminance as weights when estimating the orientation of the at least one light source relative to the automobile.

According to another aspect, the controller is further adapted to filter the estimated widths and heights of the extracted elliptical areas to reduce noise and remove outliers when estimating the orientation of the at least one light source relative to the automobile.

According to another aspect, the controller is further adapted to filter the estimated widths and heights of the extracted elliptical areas over time using a Kalman filter to reduce noise.

According to another aspect, the controller is further adapted to filter the estimated widths and heights of the extracted elliptical areas using a Hampel filter to remove outliers prior to filtering the estimated widths and heights of the extracted elliptical areas using a Kalman filter to reduce noise.

According to another aspect, the controller is further adapted to calculate an angle of orientation of the at least one light source when estimating an orientation of the at least one light source relative to the automobile.

According to another aspect, the controller is further adapted to classify the at least one light source as relevant when the angle of orientation of the at least one light source is greater than a pre-determined angle when classifying the at least one light source as one of relevant and irrelevant.

According to another aspect, the controller is further adapted to identify corresponding points between known shapes and the at least one light source, compute a homography matrix of the at least one light source, and decompose the homography matrix to determine an angle of orientation of the at least one light source.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
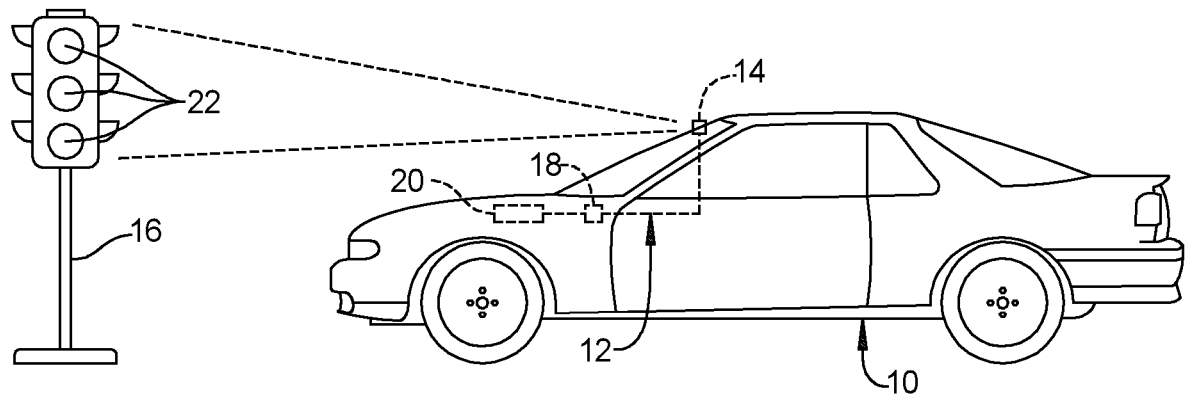
FIG. 1 is a schematic view of a system according to an exemplary embodiment of the present disclosure.

Referring to FIG. 1, an automobile 10 incorporating a system 12 for determining relevance of a light source is shown. The system 12 includes at least one camera 14 that is adapted to capture images of light sources in proximity to the automobile 10. As shown in FIG. 1, the camera 14 is capturing an image of a traffic light 16. The system 12 and method disclosed herein describes the use of at least one camera 14. It should be understood that the system 12 could incorporate any suitable number of cameras 14 without departing from the scope of the present disclosure. In many automobiles, and particularly in autonomous automobiles, cameras 14 and sensors see and interpret objects in the road just like human drivers do with their eyes. Typically, cameras 14 are positioned around the automobile at every angle to maintain a 360 degree view around the automobile 10 and providing a broader picture of the traffic conditions around them. Cameras 14 display highly detailed and realistic images, and automatically detect objects, such as other cars, pedestrians, cyclists, traffic signs and signals, road markings, bridges, and guardrails, classify them, and determine the distances between them and the automobile 10.

The system 12 further includes a controller 18 that is in communication with the at least one camera 14 and is adapted to receive captured images from the at least one camera 14. The controller 18 is a non-generalized, electronic control device having a preprogrammed digital computer or processor, memory or non-transitory computer readable medium used to store data such as control logic, software applications, instructions, computer code, data, lookup tables, etc., and a transceiver or input/output ports. Computer readable medium includes any type of medium capable of being accessed by a computer, such as read only memory (ROM), random access memory (RAM), a hard disk drive, a compact disc (CD), a digital video disc (DVD), or any other type of memory. A "nontransitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

The controller 18 is also in communication with a planning module 20 of the automobile. Autonomous driving systems includes three primary modules: perception, planning and control. Perception modules are responsible for extracting the relevant knowledge from the surrounding world and estimate the state of the ego-vehicle and other objects. The planning module 20 takes this as input and produces a collision-free trajectory for the control module. The control module executes the trajectory produced by the planning module 20. In the present system 12, the controller 18 sends relevant information about images captured by the at least one camera 14 to the planning module 20.

The controller 18 is further adapted to estimate an orientation of at least one light source 22 relative to the automobile 10, classify the at least one light source 22 as one of relevant and irrelevant, and, when the at least one light source 22 is classified as relevant, send information about the at least one light source 22 to the planning module 20 of the automobile.

In an exemplary embodiment, the controller 18 is adapted to make adjustments to the camera exposure to compensate for and reduce saturation and blooming. When shooting a bright light source such as direct sunlight or a bright light in darkness, the source of the light may appear as a bright halo with column or line defects around the highlight. This phenomenon may appear on an image and is known as blooming, smearing or streaking. This phenomenon appears when the subject illumination is so strong that the sensor pixels become saturated, this saturation usually appears as a white area on the image which is proportional to the intensity of the illumination source. Data is moved from the light sensitive pixels on the image sensor into shift registers and then on for processing. In areas where there are excessive amounts of light (photons) received on the pixel they will spill into neighboring pixels and into adjacent registers which shift this light out causing blooming. Blooming will reduce the ability of the system 12 to accurately identify the shape and dimensions of light sources 22. This can be controlled by reducing the aperture or using a neutral density filter to reduce the amount of light.

In another exemplary embodiment, the controller 18 is further adapted to use a Convolutional Neural Network technique to determine the location of the at least one light source 22 within an image by identifying connected pixels corresponding to critical colors and extracting elliptical areas of the critical colors when estimating the orientation of the at least one light source 22 relative to the automobile 10. The critical colors may be colors that should of significance, such as for example, the colors red, green and yellow, which are of particular importance when trying to identify and interpret traffic signals in captured images.

The controller 18 is further adapted to estimate widths and heights of the extracted elliptical areas by one of an elliptical Hough transform and weighted standard deviation of horizontal and vertical pixel coordinates using pixel luminance as weights when estimating the orientation of the at least one light source 22 relative to the automobile 10. The Hough transform is a feature extraction technique used in image analysis, computer vision, and digital image processing. The purpose of the technique is to find imperfect instances of objects within a certain class of shapes by a voting procedure. This voting procedure is carried out in a parameter space, from which object candidates are obtained as local maxima in a so-called accumulator space that is explicitly constructed by the algorithm for computing the Hough transform.

The classical Hough transform was concerned with the identification of lines in the image, but the Hough transform has been extended to identifying positions of arbitrary shapes, most commonly circles or ellipses. In automated analysis of digital images, a subproblem often arises of detecting simple shapes, such as straight lines, circles or ellipses. In many cases an edge detector can be used as a pre-processing stage to obtain image points or image pixels that are on the desired curve in the image space. Due to imperfections in either the image data or the edge detector, however, there may be missing points or pixels on the desired curves as well as spatial deviations between the ideal line/circle/ellipse and the noisy edge points as they are obtained from the edge detector. For these reasons, it is often non-trivial to group the extracted edge features to an appropriate set of lines, circles or ellipses. The purpose of the Hough transform is to address this problem by making it possible to perform groupings of edge points into object candidates by performing an explicit voting procedure over a set of parameterized image objects.

In an exemplary embodiment, the controller 18 is further adapted to filter the estimated widths and heights of the extracted elliptical areas to reduce noise and remove outliers when estimating the orientation of the at least one light source 22 relative to the automobile 10.

In one exemplary embodiment, the controller is further adapted to filter the estimated widths and heights of the extracted elliptical areas using a Hampel filter to remove outliers. The Hampel filter is a member of the class of decision filters that replaces the central value in the data window with the median if it lies far enough from the median to be deemed an outlier.

In another exemplary embodiment, the controller 18 is further adapted to filter the estimated widths and heights of the extracted elliptical areas over time using a Kalman filter to reduce noise. Kalman filtering, also known as linear quadratic estimation (LQE), is an algorithm that uses a series of measurements observed over time, containing statistical noise and other inaccuracies, and produces estimates of unknown variables that tend to be more accurate than those based on a single measurement alone, by estimating a joint probability distribution over the variables for each time-frame.

The Kalman filter has numerous applications in technology. A common application is for guidance, navigation, and control of vehicles. The algorithm works in a two-step process. In the prediction step, the Kalman filter produces estimates of the current state variables, along with their uncertainties. Once the outcome of the next measurement (necessarily corrupted with some amount of error, including random noise) is observed, these estimates are updated using a weighted average, with more weight being given to estimates with higher certainty. The algorithm is recursive. It can run in real time, using only the present input measurements and the previously calculated state and its uncertainty matrix, no additional past information is required.

Figure 2:
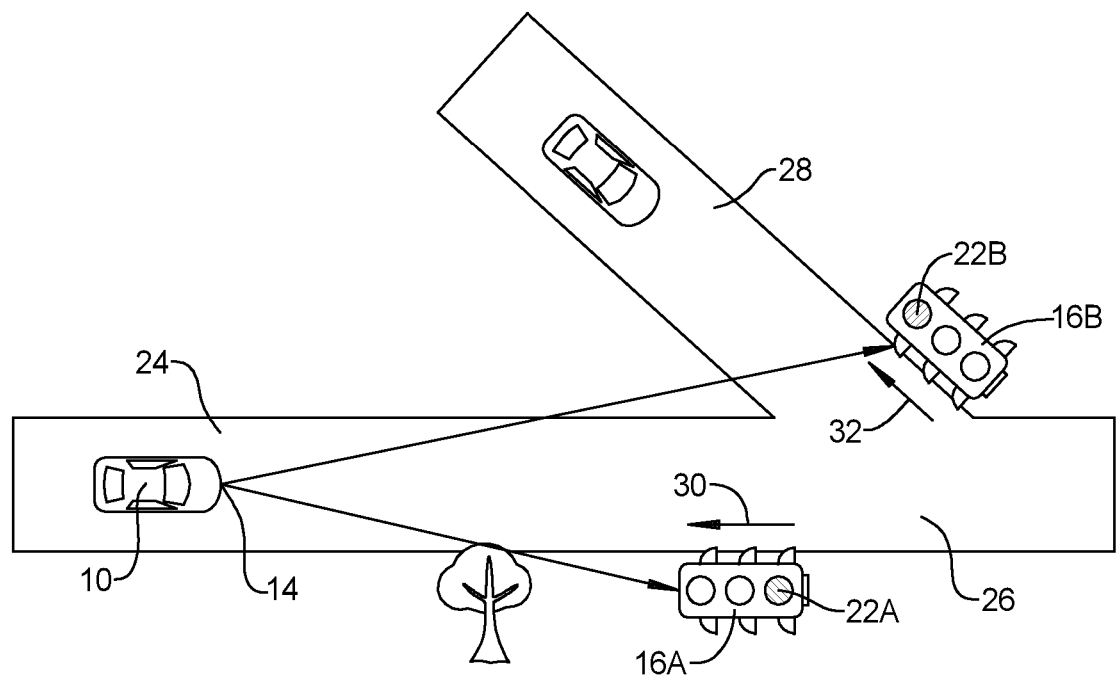
FIG. 2 is a schematic illustration of an intersection and an automobile equipped with a system according to an exemplary embodiment of the present disclosure.

The controller 18 is further adapted to calculate an angle of orientation of the at least one light source 22 when estimating an orientation of the at least one light source 22 relative to the automobile 10. Referring to FIG. 2, an automobile 10 having a system 12 according to the present disclosure is travelling on a first road 24 and approaches an intersection 26 of the first road 24 and a second road 28. A first traffic light 16A is positioned at the intersection 26 and is oriented, as indicated by arrow 30, to face traffic approaching the intersection 26 on the first road 24. A second traffic light 16B is positioned at the intersection 26 and is oriented, as indicated by arrow 32, to face traffic approaching the intersection 26 on the second road 28.

The first traffic light 16A is meant to provide guidance to the automobile 10. A camera 14 in the automobile 10 will detect the first traffic light 16A as the automobile 10 approaches the intersection 26. The second traffic light 16B is meant to provide guidance to vehicles approaching the intersection 26 on the second road 28, however, due to the angle of the intersection 26, the lights 22 of the second traffic light 16B are visible to and will be detected by the camera 14 on the automobile 10 traveling on the first road 24.

Figure 3:
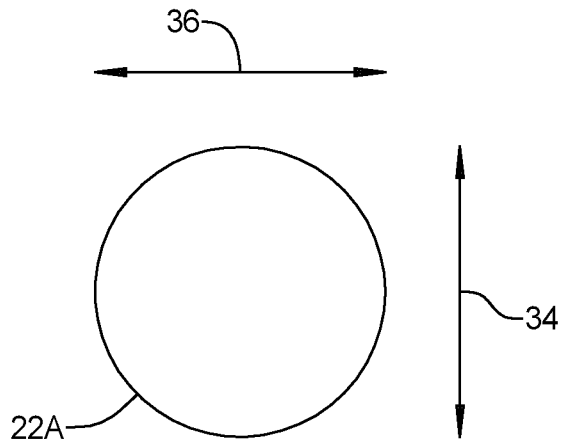
FIG. 3 is an image of a light source of a traffic light where the aspect ratio of the width to the height of the light source is approximately 1.
Figure 4:
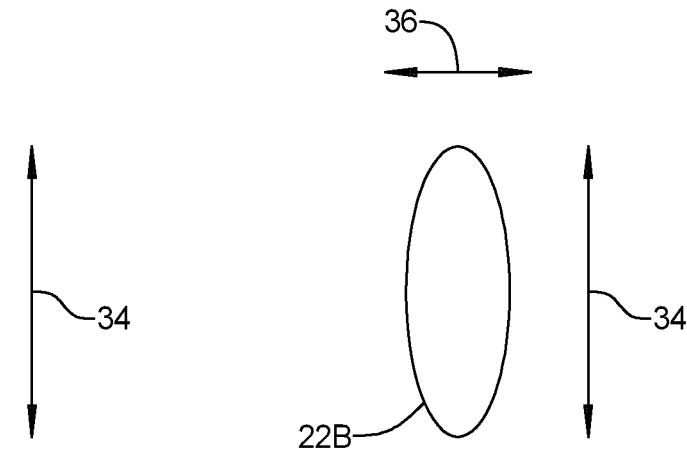
FIG. 4 is an image of a light source of a traffic light where the aspect ratio of the width to the height of the light source is less than 1.

To determine which of the two traffic lights 16A, 16B are relevant, the system 12 calculates an angle of orientation of the at least one light source 22 from each of the first and second traffic lights 16A, 16B. Referring to FIG. 3, the first traffic light 16A is presenting a red light 22A to the automobile 10. Because the first traffic light 16A is oriented to face oncoming traffic on the first road 24, the image of the circular red light 22A appears circular. The height 34 of the red light image is roughly the same as the width 36. Referring to FIG. 4, alternatively, the second traffic light 16B is presenting a green light 22B to traffic approaching the intersection 26 on the second road 28. Because the second traffic light 16B is oriented away from the oncoming traffic on the first road 24, the image of the circular green light 22B appears elliptical. The height 34 of the green light 22B image is much larger than the width 36 of the green light 22B image.

Thus, when an at least one light source 22 is oriented at an angle relative to a camera 14 that captures the image, the aspect ratio of the width 36 to the height 34 of the image changes. As seen in FIG. 3, when oriented directly toward the camera 14, the image of the red light source 22A appears circular and the height 34 and width 36 are substantially equal, and the aspect ratio between the width 36 and height 34 is approximately 1. As seen in FIG. 4, when oriented at an angle to the camera 14, the image of the green light source 22B appears elliptical and the height 34 is larger than the width 36, and the aspect ratio between the width 36 and height 34 is less than 1.

An angle of orientation is calculated by the controller 18 using the formula:

$$\text{angle} = \cos^{-1}\frac{w}{h}$$

wherein w and h are the estimated and filtered width 36 and height 34 of the captured image of the at least one light source 22.

The controller 18 is further adapted to classify the at least one light source 22 as relevant when the angle of orientation of the at least one light source 22 is greater than a pre-determined angle. When the angle of orientation becomes larger, the odds of the at least one light source 22 being relevant become less likely. To eliminate confusion, captured images or light sources 22 that have a calculated angle of orientation larger than a pre-determined angle are disregarded, and deemed "irrelevant". If the calculated angle of orientation of the at least one light source 22 is less than the pre-determined angle, then the at least one light source 22 is deemed "relevant", and the controller sends information about the at least one light source 22 to the planning module 20.

Referring again to FIG. 2, the aspect ratio for the red light 22A on the first traffic light 16A is approximately 1, and therefore, the calculated angle of orientation will be nearly zero. The red light 22A of the first traffic light 16A will be classified as relevant and information will be sent to the planning module 20 so the presence of the red light 22A of the first traffic signal 16A can be taken into consideration.

Alternatively, the aspect ratio of the green light 22B of the second traffic light 16B is less than 1. By way of example, assuming the aspect ratio of the green light 22B of the second traffic light 16B is 0.5, and the calculated angle of orientation is 45 degrees. If the pre-determined angle is 30 degrees, then the controller 18 will classify the green light 22B of the second traffic light 16B as irrelevant and it will be ignored. No information will be sent to the planning module 20 concerning the green light 22B of the second traffic light 16B.

Figure 5:
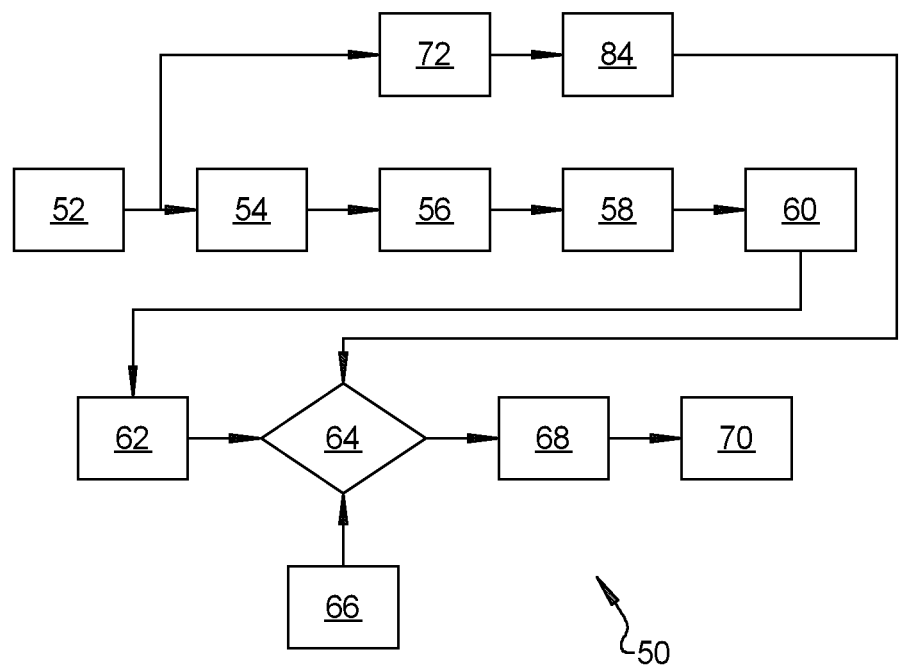
FIG. 5 is a flow chart illustrating a method according to an exemplary embodiment of the present disclosure.

Referring to FIG. 5, a flow chart illustrating a method 50 of determining relevance of a light source 22 to an automobile 10 is shown. Starting at block 52, the method 50 includes capturing images, with at least one camera 14, of light sources in proximity to the automobile 10 and sending captured images to the controller 18. Moving to block 54, the method 50 further includes using a Convolutional Neural Network technique to determine, with the controller 18, the location of at least one light source 22 within an image by identifying connected pixels corresponding to critical colors and extracting elliptical areas of the critical colors.

Moving to block 56, the method includes estimating, with the controller 18, widths 36 and heights 34 of the extracted elliptical areas using one of an elliptical Hough transform and weighted standard deviation of horizontal and vertical pixel coordinates using pixel luminance as weights. At block 58, the method 50 includes filtering, with the controller 18, the estimated widths 36 and heights 34 of the extracted elliptical areas using a Hampel filter to remove outliers, and, at block 60, filtering, with the controller 18, the estimated widths 36 and heights 34 of the extracted elliptical areas over time using a Kalman filter to reduce noise. In an exemplary embodiment, the method 50 includes making adjustments to the camera exposure to compensate for and reduce saturation and blooming. Blooming will reduce the ability of the controller 18 to accurately estimate the widths 36 and heights 34 of the extracted elliptical areas.

Moving to block 62, the method 50 further includes estimating, with the controller 18, an orientation of the at least one light source 22 relative to the automobile 10 by calculating an angle of orientation of the at least one light source 22. At block 64, the controller 18 compares the calculated angle of orientation of the at least one light source 22 to a pre-determined angle. The method 50 includes, at block 66, classifying the at least one light source 22 as "irrelevant" when the angle of orientation is greater than the pre-determined angle, and at block 68, classifying the at least one light source 22 as relevant when the angle of orientation of the at least one light source 22 is less than the pre-determined angle.

Finally, moving to block 70, when the at least one light source 22 is classified as relevant, the method 50 includes sending information about the at least one light source 22 to the planning module for the automobile.

Figures 6, 7:
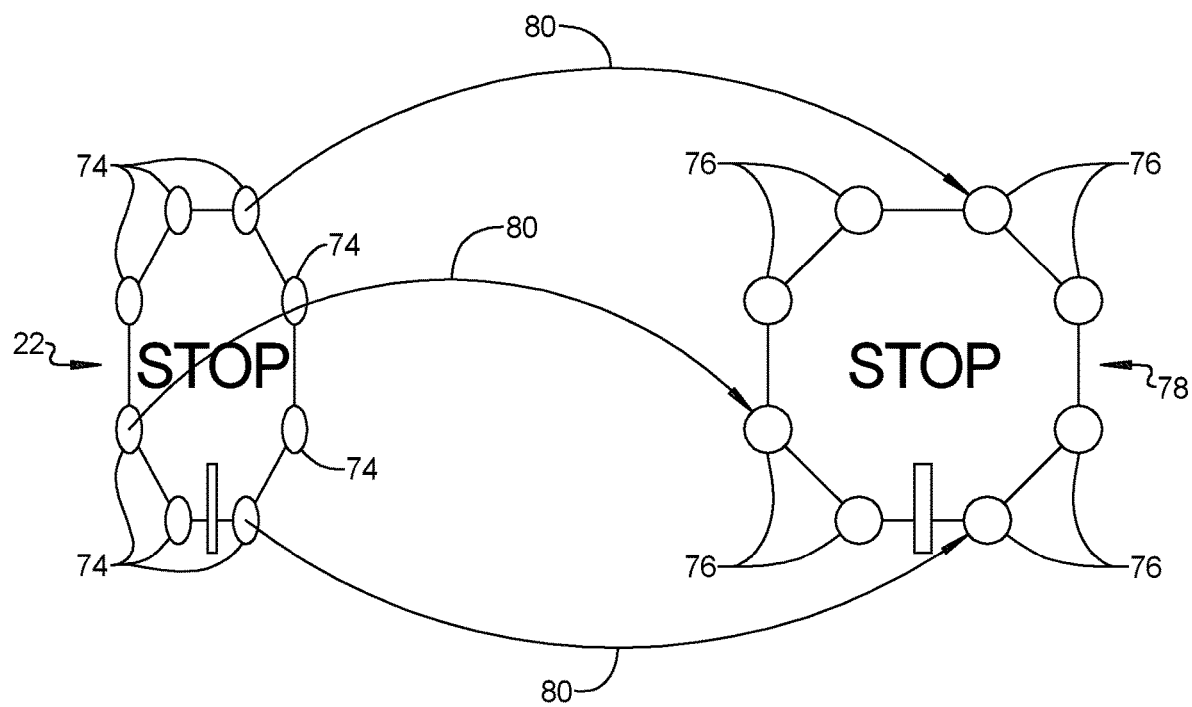
FIG. 6 is a captured image of a light source.
FIG. 7 is a known image of a light source that is correlated to the captured image of FIG. 6.

In another exemplary embodiment, after capturing images, with at least one camera 14, of light sources 22 in proximity to the automobile 10 and sending captured images to the controller 18 at block 52, moving to block 72, the method further includes identifying corresponding points 74, 76 between known shapes and the at least one light source 22. Referring to FIG. 6, points 74 are identified on a captured image of the light source 22. Referring to FIG. 7, the controller 18 matches the identified points 74 on the captured image of the light source 22 to corresponding points 76 on a known image 78, as indicated by arrows 80.

Moving to block 84, the method includes computing a homography matrix of the at least one light source 22, and decomposing the homography matrix to determine an angle of orientation of the at least one light source 22. A homography matrix is a transformation that maps the points 74 in one image, i.e. the captured image of the light source 22, to the corresponding points 76 in another image, i.e. the known image 78. Decomposing the homography matrix provides the mathematical rotational relationship between the captured image of the light source 22 and the known image 78, from which the angle of orientation of the captured image of the light source 22 can be calculated.

Moving from block 84 to block 64, the controller 18 compares the calculated angle of orientation of the at least one light source 22 to a pre-determined angle. The method 50 includes, at block 66, classifying the at least one light source 22 as "irrelevant" when the angle of orientation is greater than the pre-determined angle, and at block 68, classifying the at least one light source 22 as relevant when the angle of orientation of the at least one light source 22 is less than the pre-determined angle.

Finally, moving to block 70, when the at least one light source 22 is classified as relevant, the method 50 includes sending information about the at least one light source 22 to the planning module for the automobile.

A system 12 and method 50 of the present disclosure offers the advantage of ignoring light sources 22 that are oriented in such a way that such light sources 22 are not meant to be considered by the automobile.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of determining relevance of a light source to an automobile, comprising:
   capturing images, with at least one camera, of light sources in proximity to the automobile and sending captured images to a controller;
   estimating, with the controller, an orientation of at least one light source relative to the automobile using a Convolutional Neural Network technique to determine the location of the at least one light source within an image by:
      identifying corresponding points between known shapes and the at least one light source;
      computing a homography matrix of the at least one light source; and
      decomposing the homography matrix to determine an angle of orientation of the at least one light source;
   classifying, with the controller, the at least one light source as one of relevant and irrelevant; and
   when the at least one light source is classified as relevant, sending information about the at least one light source to a planning module for the automobile.

2. The method of claim 1, wherein the using a Convolutional Neural Network technique to determine the location of the at least one light source within an image further includes identifying connected pixels corresponding to critical colors and extracting elliptical areas of the critical colors.

3. The method of claim 2, wherein the estimating, with the controller, an orientation of at least one light source relative to the automobile further includes estimating, with the controller, widths and heights of the extracted elliptical areas.

4. The method of claim 3, wherein the estimating, with the controller, widths and heights of the extracted elliptical areas further includes estimating, with the controller, widths and heights of the extracted elliptical areas using an elliptical Hough transform.

5. The method of claim 3, wherein the estimating, with the controller, widths and heights of the extracted elliptical areas further includes estimating, with the controller, widths and heights of the extracted elliptical areas using weighted standard deviation of horizontal and vertical pixel coordinates and using pixel luminance as weights.

6. A method of determining relevance of a light source to an automobile, comprising:
    capturing images, with at least one camera, of light sources in proximity to the automobile and sending captured images to a controller;
    estimating, with the controller, an orientation of at least one light source relative to the automobile using a Convolutional Neural Network technique to determine the location of the at least one light source within an image by identifying connected pixels corresponding to critical colors and extracting elliptical areas of the critical colors;
    estimating, with the controller, widths and heights of the extracted elliptical areas;
    filtering, with the controller, the estimated widths and heights of the extracted elliptical areas to reduce noise and remove outliers;
    classifying, with the controller, the at least one light source as one of relevant and irrelevant; and
    when the at least one light source is classified as relevant, sending information about the at least one light source to a planning module for the automobile.

7. The method of claim 6, wherein the estimating, with the controller, widths and heights of the extracted elliptical areas further includes filtering, with the controller, the estimated widths and heights of the extracted elliptical areas over time using a Kalman filter to reduce noise.

8. The method of claim 7, wherein the estimating, with the controller, widths and heights of the extracted elliptical areas further includes filtering, with the controller, the estimated widths and heights of the extracted elliptical areas using a Hampel filter to remove outliers prior to filtering, with the controller, the estimated widths and heights of the extracted elliptical areas using a Kalman filter to reduce noise.

9. The method of claim 6, wherein the estimating, with the controller, an orientation of at least one light source relative to the automobile further includes calculating an angle of orientation of the at least one light source.

10. The method of claim 9, wherein the classifying, with the controller, the at least one light source as one of relevant and irrelevant further includes classifying the at least one light source as relevant when the angle of orientation of the at least one light source is greater than a pre-determined angle.

11. A system for determining relevance of a light source to an automobile, comprising:
    at least one camera adapted to capture images of light sources in proximity to the automobile;
    a controller in communication with the at least one camera and adapted to receive captured images from the at least one camera;
    the controller further adapted to estimate an orientation of at least one light source relative to the automobile using a Convolutional Neural Network technique to determine the location of the at least one light source within an image by identifying connected pixels corresponding to critical colors and extracting elliptical areas of the critical colors when estimating the orientation of the at least one light source relative to the automobile and estimating widths and heights of the extracted elliptical areas by one of an elliptical Hough transform and weighted standard deviation of horizontal and vertical pixel coordinates using pixel luminance as weights when estimating the orientation of the at least one light source relative to the automobile, classify the at least one light source as one of relevant and irrelevant, and, when the at least one light source is classified as relevant, send information about the at least one light source to a planning module for the automobile.

12. The system of claim 11, wherein the controller is further adapted to filter the estimated widths and heights of the extracted elliptical areas over time using a Kalman filter to reduce noise and remove outliers when estimating the orientation of the at least one light source relative to the automobile.

13. The system of claim 12, wherein the controller is further adapted to filter the estimated widths and heights of the extracted elliptical areas using a Hampel filter to remove outliers prior to filtering the estimated widths and heights of the extracted elliptical areas using a Kalman filter to reduce noise.

14. The system of claim 12, wherein the controller if further adapted to calculate an angle of orientation of the at least one light source when estimating an orientation of the at least one light source relative to the automobile.

15. The system of claim 14, wherein the controller is further adapted to classify the at least one light source as relevant when the angle of orientation of the at least one light source is greater than a pre-determined angle when classifying the at least one light source as one of relevant and irrelevant.

16. The system of claim 11, wherein the controller is further adapted to identify corresponding points between known shapes and the at least one light source, compute a homography matrix of the at least one light source, and decompose the homography matrix to determine an angle of orientation of the at least one light source.

* * * * *